Aug. 11, 1925.

A. O. BENSON 1,548,974

COLLAR BUTTON

Filed June 18, 1924

Inventor

ANDREW O. BENSON

By Munn &Co.

Attorneys

Patented Aug. 11, 1925.

1,548,974

UNITED STATES PATENT OFFICE.

ANDREW O. BENSON, OF LOS ANGELES, CALIFORNIA.

COLLAR BUTTON.

Application filed June 18, 1924. Serial No. 720,805.

*To all whom it may concern:*

Be it known that I, ANDREW O. BENSON, a citizen of the United States, and a resident of Los Angeles, in the county of Los Angeles and State of California, have invented certain new and useful Improvements in Collar Buttons, of which the following is a specification.

My invention relates to collar buttons, and a purpose of my invention is the provision of a collar button having an integral or rigid stud so formed as to permit the ready application and removal of the collar and collar band thereto without distorting, tearing or in any way injuring the buttonhole so that with the button in applied position the liability of the collar wings accidentally slipping off of the button is prevented.

It is also a purpose of my invention to provide a collar button which is simple, durable and inexpensive to permit of its being manufactured at a relatively low cost.

I will describe only one form of collar button embodying my invention, and will then point out the novel features thereof in claims.

In the accompanying drawings

Figure 2:
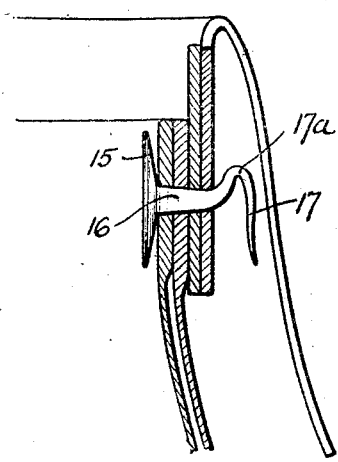
Figure 2 is a vertical sectional view of a collar band and collar, with the collar button embodying my invention in applied position thereon.
Figure 3:
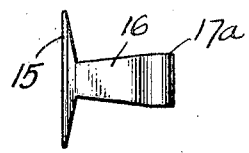
Figure 3 is a top plan view of the collar button shown in the preceding views.

Referring specifically to the drawings, in which similar reference characters refer to similar parts, my invention in its present embodiment comprises a base 15 which is substantially flat and of disk form, and extending centrally from the base is a stud including a shank 16 and a head 17. The shank, as shown in Figure 2, decreases in thickness from its point of connection with the base to the head 17, while, as shown in Figure 3, the shank increases in width from its point of connection with the base to the head 17. The head 17 is formed integral with the shank 16 and is of substantially J-form, with its curved portion or base connected to the end of the shank and disposed above the latter so as to provide a protuberance 17ª which serves to confine the collar band or collar wings against accidental displacement from the shank. The vertical portion of the head 17 extends downwardly below the plane of the shank and is slightly curved inwardly and then outwardly at its free end, as clearly illustrated in Figure 2. The head 17 is tapered in thickness from its point of connection with the shank 15 to its free end so that the latter is relatively thin to permit of its ready insertion into a buttonhole. When viewing Figure 2 it will be seen that the taper in thickness of the shank and head is continuous to the point of connection of the shank with the base 15 to the free end of the head 17.

In making the collar button it can be stamped from a single sheet of metal, one operation forming the base 15, a second operation forming the tapered stud and a third operation forming the head 17, together with the protuberance 17ª.

Figure 1:
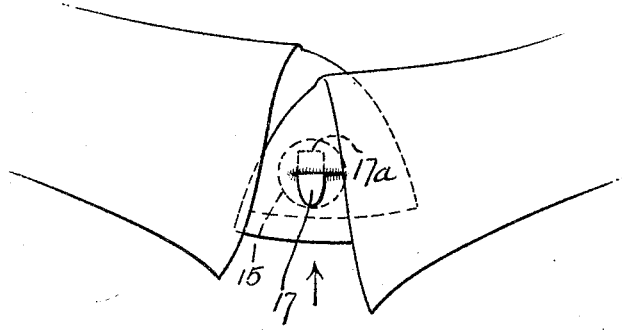
Figure 1 is a view showing in front elevation one form of collar button embodying my invention in applied position with respect to a collar.

In practice, the collar button is positioned in the manner shown in Figures 1 and 2 so that the free end of the head 17 extends downwardly to permit its insertion into a buttonhole by upward movement of the latter, as clearly illustrated in Figure 1. In this figure it will be seen that the inner wing of a collar has been applied to the button, while the outer wing is partly applied, that is to say, the head is partly extended through the buttonhole of the wing, and in order to pass the wing on to the shank 16 it is necessary to move the wing upwardly in the direction of the arrow so that it can pass over the protuberance 17ª. Due to the taper of the head 17 the slight spreading of the buttonhole is effected gradually so as to prevent distortion or undue opening of the buttonhole. After the buttonhole has passed over the protuberance 17ª it reposes upon the shank 16, and as the thickness of the shank increases toward the base it will be clear that a further spread of the buttonhole is effected to set up the necessary binding action or friction to maintain the buttonhole against slipping forwardly on the shank. This function is particularly advantageous in applying the ends of the collar band to the button so that they will lie contiguous to the base and allow the shank to project sufficiently to permit the ready application of the collar wings to the button. With the collar wings on the shank 16 it will be clear that any tendency of the wings to slip forwardly from the shank will be checked by the protuberance 17ª, thus preventing accidental displacement of the collar wings from the button.

Although I have herein shown and described only one form of collar button embodying my invention, it is to be understood that various changes and modifications may be made herein without departing from the spirit of the invention and the spirit and scope of the appended claims.

What I claim is:

1. A collar button comprising a base, a shank extending at an angle from the base, a flat head on the free end of the shank and extending beyond opposite sides of the shank, said shank increasing in width from the base to the head and decreasing in thickness from the base to the head.

2. A collar button comprising a base, a shank extending from the base and of angular form in cross section, and a flat head on the free end of the shank and extending beyond opposite sides of the shank, said head being of angular form in cross section and decreasing in thickness from its point of connection with the shank to its free end.

ANDREW O. BENSON.